Figure 1:
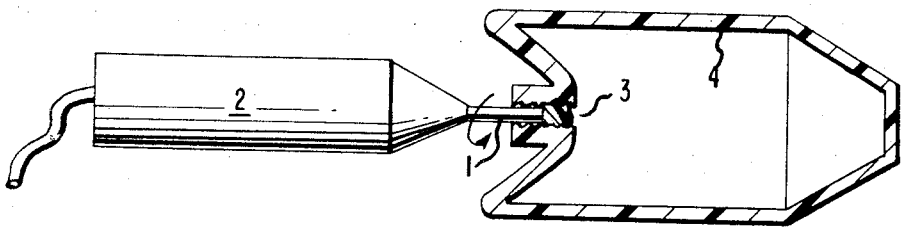
Figure 2:
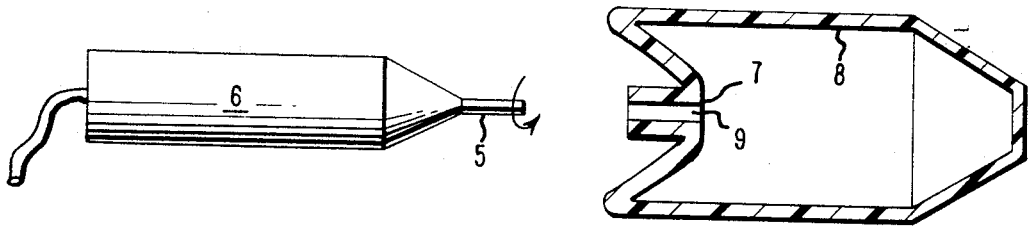
Figure 3:
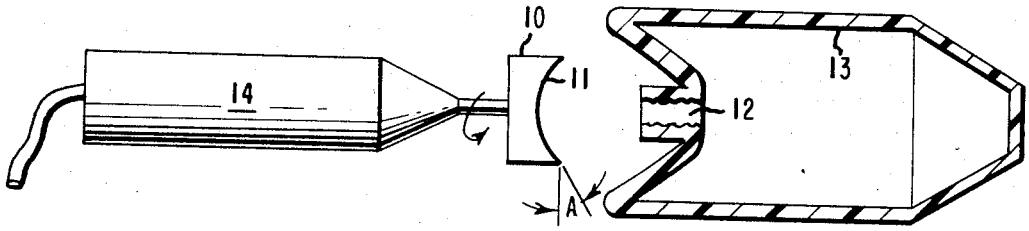
Figure 4:
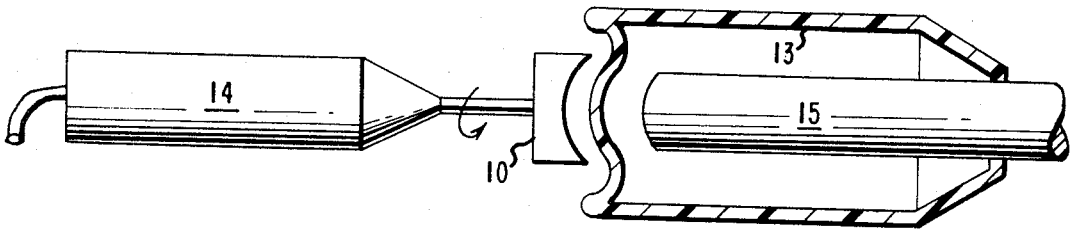
Figure 5:
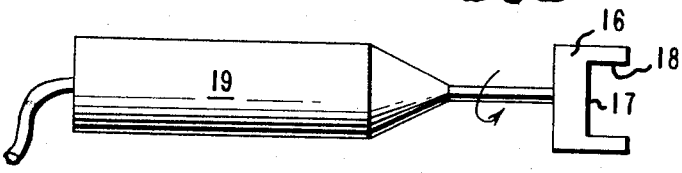

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 14, 1973

913 O.G. 392

T913,002
FRICTION-WELDED BOTTOM SEALS ON THERMOPLASTIC BOTTLES

Keith Stewart Carmichael, 8 Janice Drive, Beverly Woods, Wilmington, Del. 19803

Continuation of abandoned application Ser. No. 57,679, July 23, 1970. This application May 22, 1972, Ser. No. 255,843

Int. Cl. B29c *27/08*
U.S. Cl. 264—68
1 Sheet Drawing. 10 Pages Specification

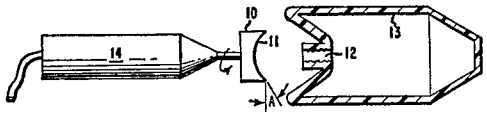

A process and apparatus for sealing a bottom opening in a thermoplastic bottle by:

(a) contacting the bottom of the thermoplastic bottle in the area immediately adjacent the bottom opening with a rotating friction sealing head to raise the temperature of the thermoplastic material to about its melting point, working the hot thermoplastic material into and sealing the bottom opening, and thereafter (b) quenching the sealed opening.

Aug. 14, 1973 K. S. CARMICHAEL T913,002

FRICTION-WELDED BOTTOM SEALS ON THERMOPLASTIC BOTTLES

Original Filed July 23, 1970

INVENTOR
KEITH STEWART CARMICHAEL

BY James Ref Weechie

ATTORNEY